June 30, 1970 M. C. LEINBERGER ET AL 3,518,645

RANDOM ACCESS DATA STORE

Original Filed March 15, 1960 6 Sheets-Sheet 1

INVENTORS:
Merton C. Leinberger
Richard T. Peters

By Louis A Kline
John J. Matlago
Their Attorneys.

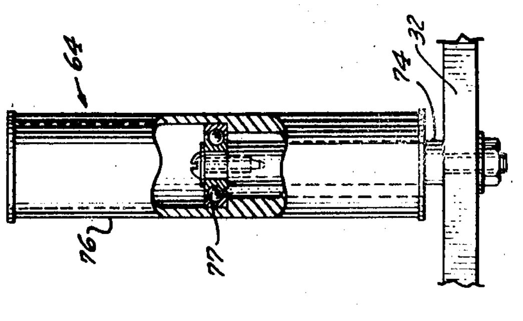
FIG. 4
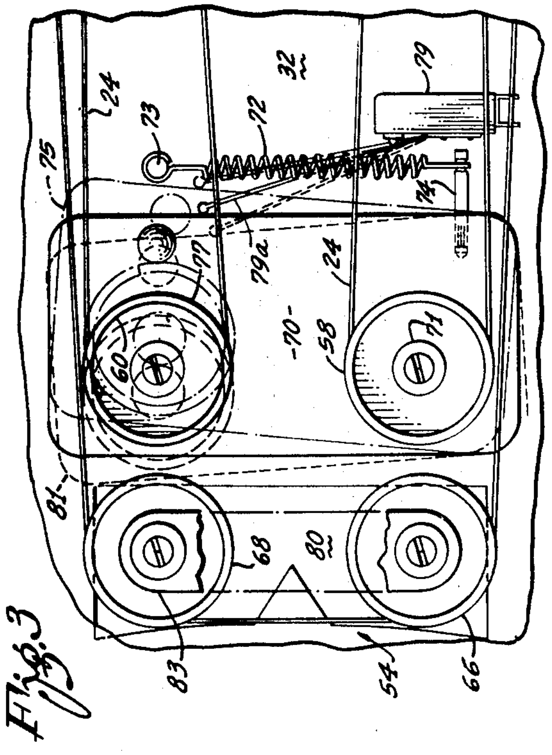
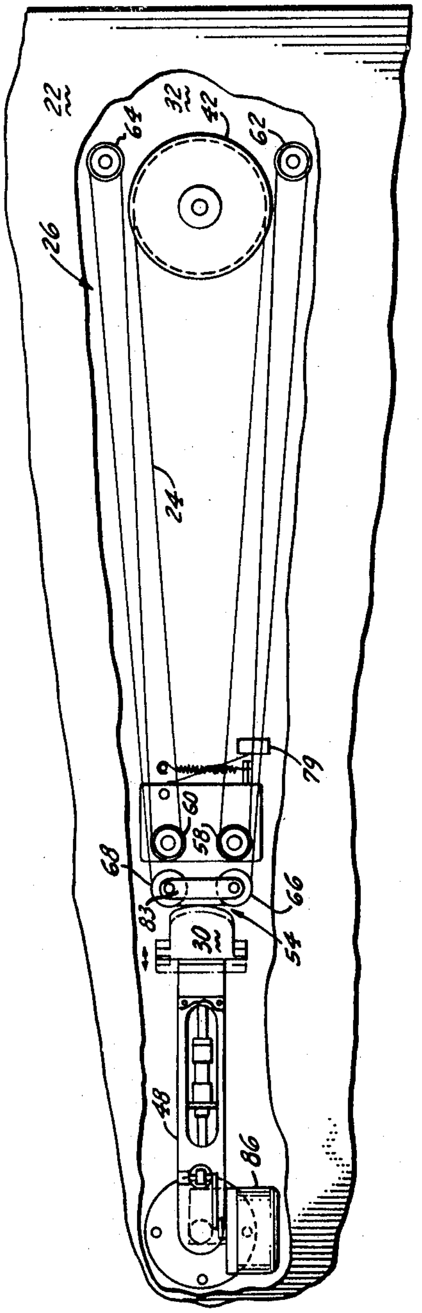
FIG. 2
INVENTORS:
Merton C. Leinberger
Richard T. Peters
By Louis A. Kline
John J. Matlago
Their Attorneys.

RANDOM ACCESS DATA STORE

Original Filed March 15, 1960 6 Sheets-Sheet 3

INVENTORS:
Merton C. Leinberger
Richard T. Peters
By Louis A Kline
John J. Matlago
Their Attorneys.

RANDOM ACCESS DATA STORE

Original Filed March 15, 1960

INVENTORS:
Merton C. Leinberger
Richard T. Peters

By Louis A Kline
John J. Matlago
Their Attorneys.

RANDOM ACCESS DATA STORE

Original Filed March 15, 1960 6 Sheets-Sheet 5

INVENTORS:
Merton C. Leinberger
Richard T. Peters
By Louis A. Kline
John J. Matlago
Their Attorneys.

RANDOM ACCESS DATA STORE

INVENTORS:
Merton C. Leinberger
Richard T. Peters

By Louis A. Kline
John J. Maclago
Their Attorneys.

United States Patent Office 3,518,645

Patented June 30, 1970

3,518,645

RANDOM ACCESS DATA STORE

Merton C. Leinberger, Inglewood, and Richard T. Peters, Torrance, Calif., assignors to The National Cash Register Company, Dayton, Ohio, a corporation of Maryland

Continuation of application Ser. No. 15,147, Mar. 15, 1960. This application Nov. 25, 1964, Ser. No. 415,565
Int. Cl. G11b *3/30, 23/12*
U.S. Cl. 340—174.1 3 Claims

ABSTRACT OF THE DISCLOSURE

A quasi-random access data store is disclosed which provides for access to any selected one of a plurality of tape loops having parallel data tracks by selectively positioning a multi-record head at scanning stations disposed to position respective tape loops for cooperation with the multi-record head.

This invention is a continuation of patent application Ser. No. 15,147, filed Mar. 15, 1960, and now abandoned and relates to information-storage apparatus for electronic computing systems, and more particularly to apparatus of the class that permits easy and quick access to information storage areas provided in any selected one of a plurality of individual storage sections included in a data store.

The operation of storing information for future use is a basic part of the workings of a general purpose electronic computer, whether it is designed for mathematical calculations or business data processing. The need for the retention of operating commands, of partial results, of starting data, and of calculated results all require the computer to possess the ability to store, and recall on command, a large number of units of information.

The internal storage units of most existing electronic computers have been found to be of inadequate size to store all the desired information; furthermore, the obvious expedient of expanding these units to the required capacities is ruled out at the present state of the art by cost considerations. Hence, it is customary to include in the data processing system some form of auxiliary storage which sacrifices operating speed for the needed capacity at reasonable cost. These auxiliary memories may be broadly described as being either of the sequential or random access type. In a sequential memory, access to stored information may be had only in some prearranged order, whereas in a random access memory, any one of a plurality of stored data or sections of stored data may be accessed in approximately equal time, and the accessing is not limited to a particular sequence. Thus the random access memory is, in general, much faster, but pays for the increase in speed with equipment complexity, and hence cost.

The present invention is directed to a data storage device of moderate cost providing the advantage of a relatively short access time to large amounts of data. The system provided is actually a semisequential or quasi random access data store, since, although the overall data store is divided into individually accessible sections for random access to any section, having once accessed a selected one of the storage sections, the data thereon is only sequentially available. However, the feature of the system which provides random access to the various storage sections so greatly contributes to its usefulness that the system is aptly described as a random access data store in the class of auxiliary memories.

In the preferred embodiments of the present invention the data store comprises a plurality of magnetic tape loops disposed on individual tape transports for driving the tapes past respective scanning stations. The tape transports are disposed in a circular assembly configuration to enable a movable transducer means located centrally in the assembly to have an easy and quick access to the scanning station of any selected one of the tape loops. Thus having rotatably positioned the transducer means to the scanning station of any one of the tape loops, the storage areas of the moving tape are then sequentially scanned by the transducing means.

It is an object, therefore, of the present invention to provide an improved data store in which random access is provided to large amounts of data.

Another object of the present invention is to provide an improved auxiliary memory for computers or a random access computer data store employing magnetic tapes having a capacity for storing large amounts of quickly accessible data as required for business problems and involved mathematical problems.

A further object is to provide a random access data store having a capacity for large amounts of data which is simpler in construction and operation than previously known large capacity random access data stores.

A still further object is the provision of an auxiliary memory in which the data store comprises a plurality of individual magnetic tape loop units and a single movable transducer unit which latter is arranged and constructed to be selectively positioned for cooperating with any one of the tape loops.

Further objects and features of the invention will be readily apparent to those skilled in the art from the following specification and appended drawings illustrating certain preferred embodiments in which:

FIG. 2 is a detail view of a portion of the apparatus shown in FIG. 1, showing a tape transport and the transducing means;

FIG. 3 is a detail view of a portion of a tap transport to illustrate the operation of certain parts thereof;

FIG. 4 is a detail view, partly in section, of a typical roller used in a tape transport;

Figure 1:
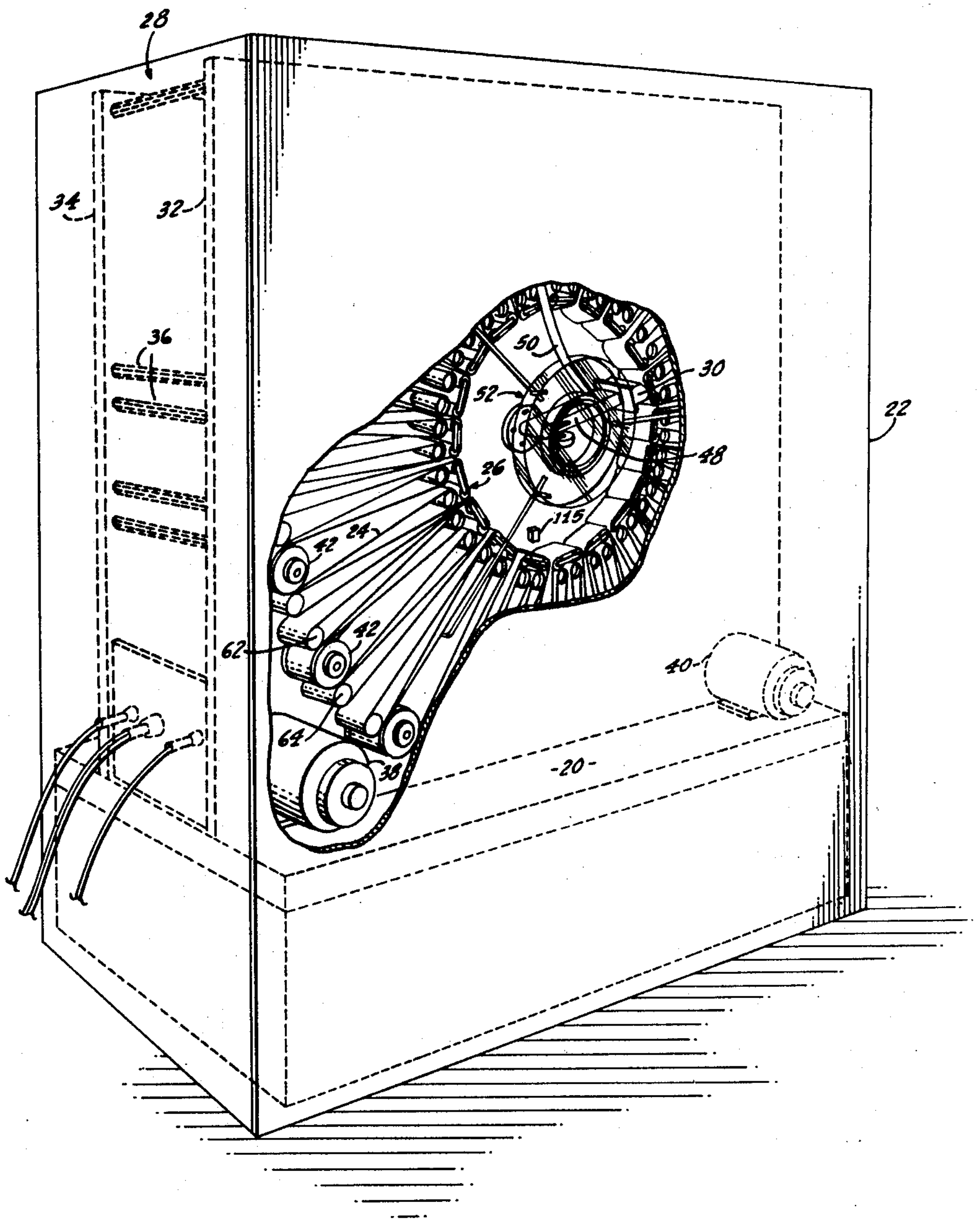
FIG. 1 is a perspective view of a preferred embodiment ment of the invention, in which a portion of the housing has been broken away to show the general arrangement of the apparatus enclosed.
Figures 8, 9, 10:
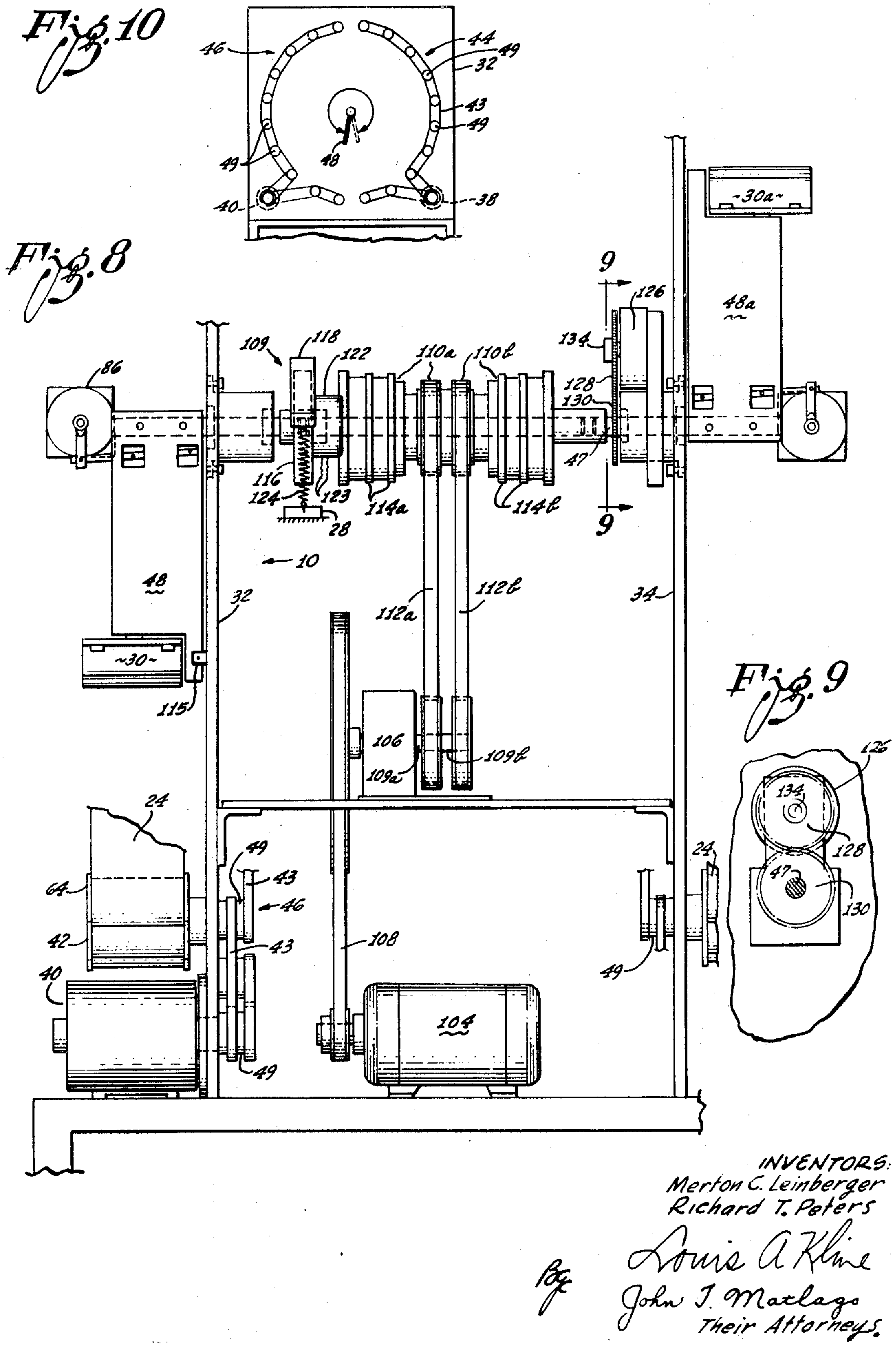
FIG. 8 is a view showing the details of the driving apparatus for the transducing means and the tape transports shown in FIG. 1.
FIG. 9 is a detail view, partly in section, taken along the line 9—9 of FIG. 8.
FIG. 10 is a view indicating the overall driving arrangement for a bank of the tape transports.

Referring now to the drawings wherein like reference characters designate like or corresponding parts throughout the several views, there is shown in FIG. 1 a preferred embodiment of a large capacity storage device provided with an arrangement for rapidly accessing storage areas in any selected one of a plurality of storage units. The respective storage units are in the form of individual magnetic tape loops 24 provided on respective tape transports 26 (FIG. 2). The tape transports are arranged and disposed in a circular array on a front panel 32, forming an assembly as shown, such that each tape loop is driven along radial paths extending from an inner circle to an outer circle of the assembly. A single transducer unit 30 having a plurality of magnetic heads spaced along the face thereof is mounted on an arm 48 pivotally mounted at the center of the assembly such that it can be positioned at different scanning stations to cooperate with a portion of any of the tape loops as they are driven past the scanning areas located at the inner circle of the tape transport assembly. The apparatus, as shown, is supported on a base 20 and enclosed by a cabinet 22. The storage file is divided into two banks, a front assembly or bank of tape loops whose tape transports are supported on front panel 32, as visible in FIG. 1, and a rear bank of tape loops whose tape transports are supported on a rear panel 34. Rear panel 34 is supported in spaced relation to the front panel 32 by spacing rods 36. The rear bank is substantially identical to the front bank, and each of the front and rear banks of tape transports are provided with two motive drives, as schematically depicted in FIG. 10, which indicates the drive trains 44 and 46 provided for driving the respective tape transports on each half of a bank. Thus, as viewed from the rear of the front panel 32, the tape transports on the right of the front bank are coupled to motor 38 and the tape transports on the left are coupled to motor 40. Each tape transport 26 includes a drive capstan 42 (see FIGS. 2 and 8) which is connected to a respective pulley 49 on the back of panel 32 by individual capstan drive shafts passing through the panel. The pulleys 49 on each half of the bank are drivingly interconnected into respective groups by belts 43, as shown in FIG. 10.

Figure 5:
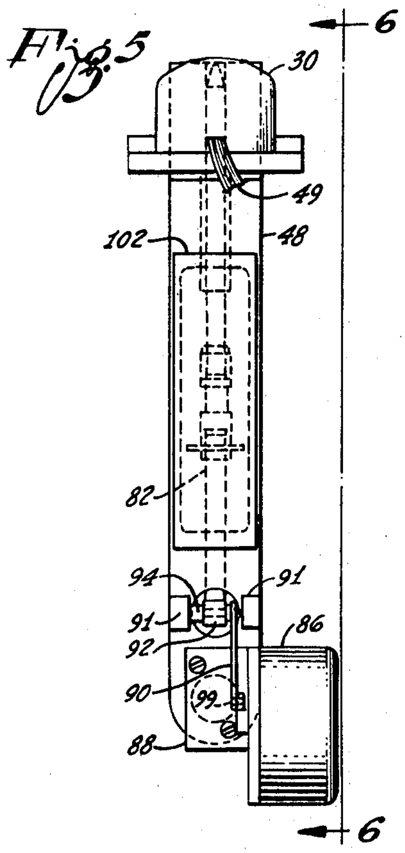
FIG. 5 is a detail plan view of a transducer arm assembly.
Figure 6:
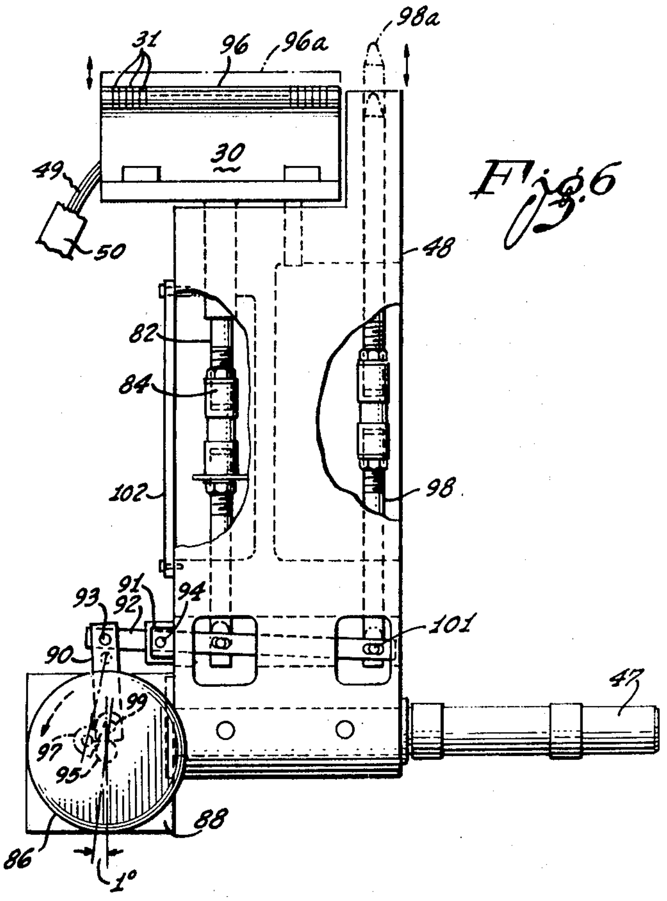
FIG. 6 is a detail side view of the transducer arm assembly with portions broken away to show its internal construction.

The assembly for positioning the multi-head transducer unit 30 to cooperate with a predetermined tape loop includes transducer arm 48 mounted on a drive shaft 47, as shown in detail in FIG. 6, for rotation about the central axis of the assembly of tape loops 24. As also shown in FIG. 6, the transducer arm 48 includes a device for radially positioning and indexing the transducer unit, after it has been rotationally positioned to cooperate with a predetermined tape loop. In the preferred arrangement, the transduced unit 30 includes a plurality of magnetic heads 31 (FIG. 6) arranged across its face to read, record, or erase information in corresponding tracks on the tape. Transducer leads 49, coupled to the magnetic heads, are bound into a cable 50, as shown in FIGS. 1 and 5, and the cable is looped around a stationary reel 52 permitting the cable to wind and unwind from the reel during arcuate travel of the transducer unit 30. In this manner, the transducer leads 49 are coupled from the rotational motion of the transducer unit to the static mounting of the frame 28 without tangling or crimping of the leads which tend to produce metal fatigue and breaking of the leads.

In FIG. 2, a portion of the cabinet 22 has been broken away to show the transducer unit 30 at a scanning station whereat it engages a portion of a continuous record medium or tape loop 24 mounted on a typical tape transport 26 for travel past a scanning area 54. The tape transport apparatus individual to a tape loop 24 is arranged as shown to minimize the annular space or sector required for handling a tape loop of the desired length, while accurately positioning any portion of the tape in the scanning area 54 of a scanning station for cooperation with the transducer unit 30. The typical tape transport 26, shown in FIG. 2, includes capstan 42 which is driven by one of the belt trains 44 or 46. The capstan is connected to a pulley 49 coupled in the respective drive train located on the opposite side of panel 32, as shown in FIG. 8. Each continuous tape loop 24 passes from the capstan 42 located at the outer end of the transport to a front idler roller 58 then back to a rear idler roller 62 then forward again to front guide rollers 66 and 68 which provide the scanning area, then back to rear idler roller 64, forward to front idler roller 60 and finally back again to capstan 42 to close the loop. This arrangement effectively triples the tape loop length for each tape transport without using up too much of the annular space surrounding the transducer unit, thus greatly increasing the overall capacity of the storage unit.

As shown in detail in FIG. 3, the idler or tension roller 60 is mounted on a movable plate 70 which pivots on a rod 71 upon which the idler roller 58 is mounted. The plate 70 is spring biased toward guide roller 68 by the leverage about rod 71 produced by the tension of a spring 72 connected between pins 73 and 74, which pins are secured to the front panel 32 and the plate 70, respectively. The tension roller 60 and plate 70 is moved manually against the spring bias into the position 75, indicated by the dotted lines, in order to permit the tape loop to pass over a peripheral flange 77 located on the outer edge of the tension roller 60 during the mounting of tape loop 24 on the tape transport 26. In FIG. 3, the tension roller 60 is shown in position with a typical tape loop 24 mounted on the tape transport 26. In this position the plate 70 is located between its opposite extreme positions, indicated by dotted lines 75, 81 in the drawing. The exact position of the tension roller 60 will vary between these extreme positions depending upon the length of the tape loop 24 which can vary within prescribed tolerances.

A switch 79 having an actuator arm 79*a* spring biased against the edge of the plate 70, is mounted on the panel 32. In the event the tape loop is not on the transport, the plate 70 is moved about rod 71 by the tension of spring 72 to the position 81, shown in dotted lines, thereby actuating switch 79 to cut off the power to the drive motors 38, 40 shown in FIG. 1.

In FIG. 4, a typical idler roller 64 has been shown which is constructed to compensate for variations in length of a tape loop from one edge to the other edge thereof. This is necessary to prevent the tape from riding up over the flanges and off the surface of the roller between the flanges. The cylinder 76 which forms the surfaces of roller 64 is mounted for rotation on a shaft 74, one end of which is secured in the panel 32, as shown. The opposite end of the shaft 74, which extends to the center of the cylinder 76, is reduced in cross section to seat the inner race of a ball bearing 77. The outer race of the bearing seats on an internal shoulder of the cylinder 76 and is press fit around the inner periphery of the counterbore adjacent the shoulder. Since the roller cylinder 76 is supported for rotation on a single bearing, the movement between races of the bearing due to bearing tolerances will be transmitted to the roller cylinder permitting the roller cylinder to rotate on an oblique axis. Any uniform variation in length of a continuous tape loop 24, from one edge to another along the width thereof, is thus taken up by the skew of the roller cylinder which automatically adjusts to the variation. In the preferred embodiment, the tape loop 24 is approximately three inches wide and variations in length of the loop across the width thereof are compensated in the tape transport by the self-aligning idlers 58, 60, 62 and 64.

Figure 7:
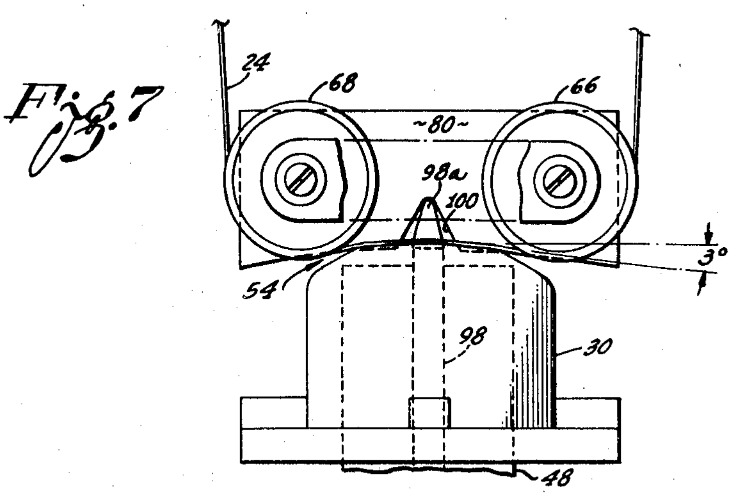
FIG. 7 is a detail view showing a portion of a tape transport cooperating with the indexing apparatus of the preferred embodiment.

The guide rollers 66 and 68 in each tape transport 26 are disposed and spaced as shown in the detailed view of FIG. 7 to provide a scanning area 54 at the scanning station for the proper alignment and engagement of any portion of the tape loop, passing over the rollers with the magnetic heads 31 (FIG. 6) provided at the face of transducer unit 30. As indicated, the tape is passed over the surfaces of the guide rollers between the respective peripheral flanges at the edges of each guide roller. The length of the portion of the tape, disposed between the rollers as shown, provides an adequate scanning area for all of the magnetic heads in the face of the transducer unit 30. The spacing of the guide rollers 66, 68 permits deflection of the tape by the transducer unit 30 during reading, recording or erasing of information or at any time the transducer unit is positioned radially to engage the tape at the scanning station.

In order to provide accurate and uniform transverse alignment of the transducer unit 30 and an opposing portion of a tape which is disposed in the scanning area 54 at each scanning station, the guide rollers 66 and 68 provided at each scanning station are precisely mounted on their shafts at a uniform distance from the panel 32 by guide roller mounting blocks 80. In this manner, the spacing of the guide rollers from the panel 32 is regulated to assure uniform transverse alignment of the transducer unit with the tape in the scanning areas 54 at all scanning stations, i.e., to assure positioning of the respective magnetic heads 31, located in the face of the transducer unit over the respective channels of the magnetic tape in the scanning areas, as the transducer unit is moved from one scanning station to another during operation.

In FIGS. 5 and 6, the transducer arm 48 has been illustrated in detail. As shown, the radially projecting transducer arm is mounted on the drive shaft 47 to rotate with the shaft. The transducer unit 30 is disposed for radial movement in an opening provided in the outer end of the arm 48 and is secured to the outer end of a transducer mounting rod 82 slidably disposed within the arm. Radial movement of the rod 82 and the transducer unit 30 is controlled by an electromechanical arrangement including a rotary solenoid 86 which is connected to the rod 82 by a mechanical linkage for converting the rotary motion of the solenoid armature to radial motion of the rod, i.e., linear movement within the radial arm 48. The mechanical linkage connecting the solenoid 86 to the transducer mounting rod 82 includes a solenoid bar link 90 and an operating lever 92 which latter pivots on a pivot pin 94 supported between lugs 91 secured to arm 48. The bar link 90 is pivotally connected to a pin 99, mounted eccentrically on a rotary armature 95 of solenoid 86. The outer end of bar link 90 is connected to the lever 92 by a pivot pin 93, as shown, to move the face of the transducer unit a predetermined distance from its normal radially retracted position 96 to its radially extended position indicated by the line **96*a* upon actuation of the solenoid 86. Actuation of the solenoid 86 rotates the solenoid armature 95 in a counterclockwise direction approximately 60° such that pin 99 is in the position indicated by the dotted lines 97. This causes operating lever 92 to pivot counterclockwise about pivot pin 94, and for rod 82** to move radially outward.

The electromechanical arrangement for radially positioning the transducer unit 30 to cooperate with a selected tape loop 24 is designed to prevent movement of the transducer unit radially outwardly in response to centrifugal forces exerted thereon during rotation of the transducer arm 48 by positioning the pivot pin 99 for bar link 90 to the right of the vertical-center of rotary armature 95 by approximately one degree, as indicated in FIG 6, when the solenoid is returned to its clockwise limit of travel. With this arrangement, during the periods of the transducer unit 30 is in its normal retracted position 96, any forces acting on the transducer unit tending to project it radially outwardly would result in an inward radial movement of the bar link 90, thus locking the arm in its normal retracted position. Until the solenoid 86 is actuated, the pivot pin 99 remains in its off the vertical-center position to prevent an inward radial movement of bar link 90. Actuation of the solenoid moves the pivot point 99 counterclockwise unlocking the linkage. In this manner, radial movement of the transducer will be inhibited during rotation of the transducer arm while it can be simply and quickly positioned for cooperation with the tape at a scanning station upon actuation of the solenoid 86.

Referring now to FIGS. 5, 6 and 7, an indexing arrangement for accurately positioning the transducer arm 48 over the scanning area 54 of a scanning station to engage the tape between guide rollers 66, 68 is provided as shown, by an indexing rod 98 having a tapered end **98*a* which seats in the end of an indexing slot 100 formed in the block 80 and located midway between guide rollers 66 and 68**.

The indexing rod 98 is slidably disposed for radial movement in the transducer arm 48, as shown. The indexing rod is confined to move parallel to the rod 82 in an opening provided in arm 48, and the inner end thereof is connected to the outer end of the same side of operating lever 92 as the rod 82, whereby the rods 82 and 98 are moved simultaneously upon actuation of the solenoid 86. In addition to providing for simultaneous motion of the rods, the rod 98 is connected to the lever 92 to travel a greater distance than the rod 82 as indicated by the longer lever arm to the pivot connection 101. The tapered end **98*a* of rod 98 passes and leads the face of the transducer unit 30 during radial movement to seat in the end of the slot 100 to accurately position the transducer unit midway between guide rollers 66, 68. The radial movement of the tapered end 98*a* leads the radial movement of the transducer unit 30 sufficiently to enter the slot 100 to position the transducer unit over the scanning area 54 before the face of the transducer unit engages the tape 24**.

The indexing rod 98 remains seated in the end of the slot 100 until the solenoid 86 is de-energized to return the transducer unit and the indexing rods to their respective normal retracted positions to prepare for movement of the transducer unit to another scanning station.

If the transducer arm 48 is not positioned accurately over the block 80 to locate the tapered end **98*a* of indexing rod 98 in the slot 100, the face of transducer unit 30 is prevented from striking either guide roller by engagement of the tapered end 98*a* and the spacer block 80. Also, upon failure of the solenoid or the mechanical linkage, causing the transducer unit to be projected radially to the position 96*a* during rotation of the transducer arm 48, the tapered end of the indexing rod 98 will strike the spacer block 80 to prevent the face of the transducer unit 30 from striking the guide rollers 66, 68**. Thus, damage to the transducer unit and guide rollers resulting from engagement of the transducer unit face and the guide rollers will be prevented.

In FIG. 8, which shows the details of the assembly for driving and rotationally positioning the transducer arm, an integral drive shaft 47 is shown with one of the transducer arms 48 and **48*a* connected securely to each of its ends. Drive shaft 47 is mounted to be rotated by a bi-directional driving source which includes a drive motor 104 connected by a drive belt 108 to a bi-directional gear train disposed in a housing 106. The output shafts 109*a* and 109*b* of the bi-directional gear train are individually coupled to respective clutches 110*a* and 110*b* of a pair of magnetic-powder counter-rotating clutches by respective drive belts 112*a* and 112*b*. In operation, drive belts 112*a* and 112*b* are driven at a constant speed in opposite directions. The transducer arms 48, 48*a* remain stationary and the clutch driving members rotate free of the shaft 47 until one or the other of the clutches is engaged. When it is desired to drive the transducer arms 48 and 48*a*, a D.C. current is supplied to one or the other of the clutches 110*a*, 110*b* through respective slip rings 114*a* or 114*b*, depending upon the direction in which it is desired to rotate the transducer arms. The amount of torque transmitted by clutch 110***a* or 110*b* to the drive shaft 47 is controlled by adjusting the amount of current supplied to it. A more detailed description of the control of the rotation and positioning of transducer arms 48, 48*a* is set forth infra in the description of the transducer arm positioning electrical control system shown in FIG. 11.

It should be noted that transducer arm 48 secured on one end of shaft 47 supports the transducer unit 30 for rotation in the center of the front bank or assembly of tape transports, and that transport arm 48*a* secured on the other end of shaft 47 supports the transducer unit 30*a* for rotation in the center of the rear bank or assembly of tape transports. The transducer arms 48 and 48*a* are securely mounted on shaft 47 to project radially in opposite directions to increase the balance of the assembly during rotation.

Figure 11:
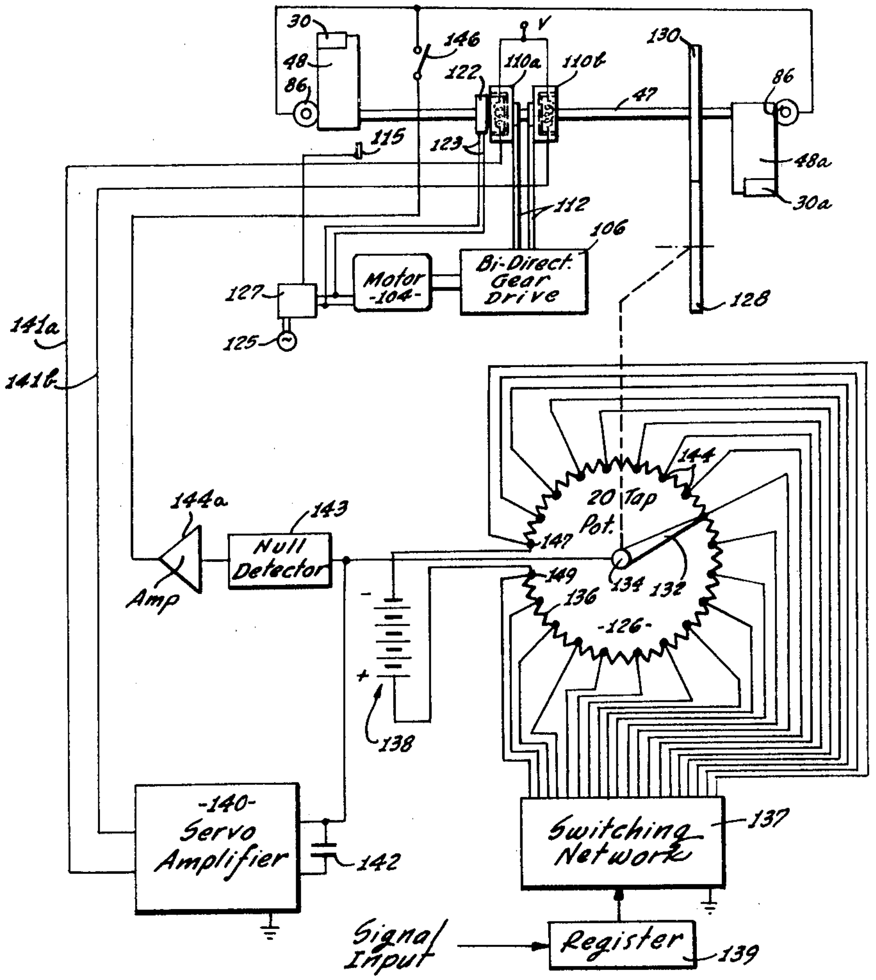
FIG. 11 shows a schematic circuit diagram of the position control system and also shows the movable transducer means for the respective banks of tape transports to illustrate the operation of the system.
Figure 12:
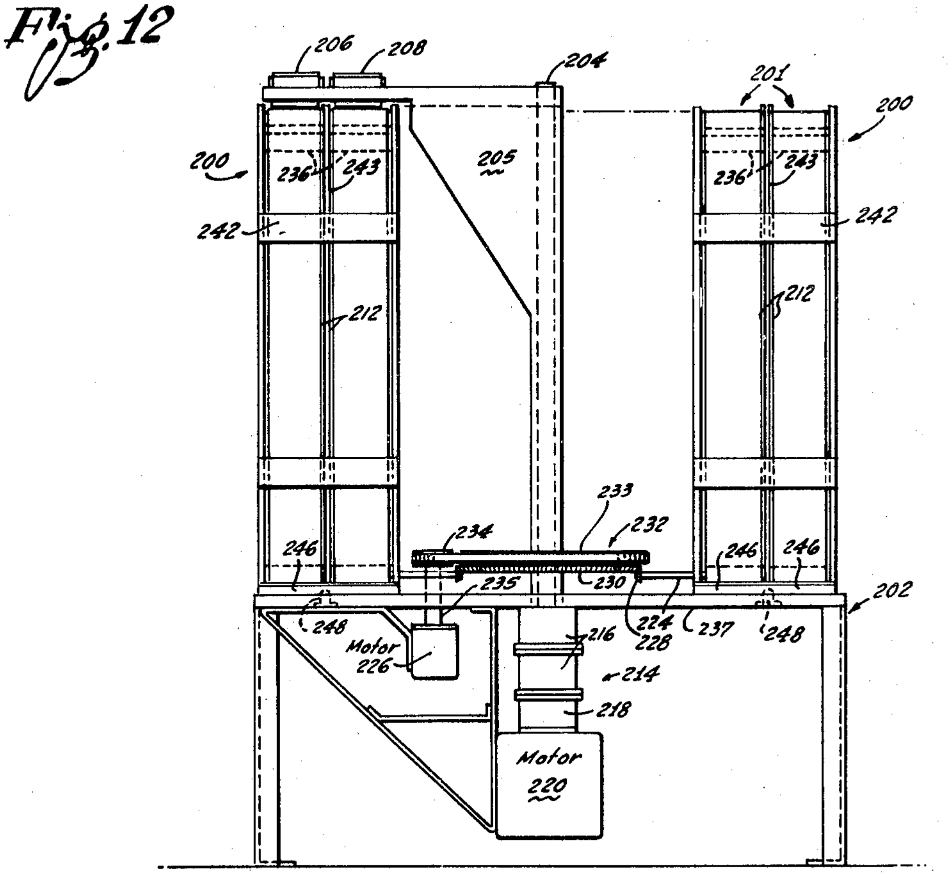
FIG. 12 is a view, with parts omitted for clarity, of an alternate preferred embodiment of the invention.

A brake assembly 109 is disposed about the shaft 47 adjacent the clutch 110*a* to stop the drive shaft upon interruption of power to the drive motor 104. The assembly includes a brake drum 116 which is mounted on the shaft 47 and a brake shoe 118 which is supported to cooperate with the brake drum 116. The brake shoe 118 is coupled to the armature of a rotary solenoid 122 which when energized moves the brake shoe away from the brake drum 116 against the tension of a spring 124 connected between a portion of the frame 28 and the end of the brake shoe 118 shown in FIG. 8. The solenoid 122 is connected by leads 123 to a power supply source 125, as shown in FIG. 11, to be normally energized for preventing positive braking engagement of the brake shoe 118 and the drum 116; however, a slight braking action by the assembly is preferred to prevent oscillation or movement of the shaft by clutch 110. Positive braking to stop the drive shaft 47 and rotation of the transducer units 30, 30*a* is provided when the power to the motor 104 is interrupted by a switch or contactor 127. Upon interruption of the power to the drive motor 104, the solenoid 122 is de-energized and the brake shoe is drawn against the periphery of the brake drum by the tension of spring 124 to stop the drive shaft 47 and the transducer arms 48, 48*a*.

In FIGS. 8 and 9, a rotary potentiometer 126 is shown coupled to the drive shaft 47 by gear train including spur gears 128 and 130. The gear 128 is coupled to a movable wiper 132, shown in FIG. 11, by a gear shaft 134. The gear 130 mounted on the shaft 47 meshes with gear 128 to drive the potentiometer wiper 132, whereby a signal voltage is derived from the potentiometer 126 for positioning the transducer arms 48, 48*a*.

Referring briefly to FIG. 1, it will be noted that multi-head transducer unit 30 is movably mounted so that it can be positioned at selected scanning stations to cooperate with individual tape loops. In order to rotationally position the transducer unit 30 at a selected scanning station, whereby the transducer unit can then be moved radially to engage or cooperate with a selected tape loop upon which it is desired to record, read or erase information, a null seeking position electrical control system is provided as shown in FIG. 11. This control system generates a control signal indicative of the deviation of the transducer arm from the desired tape loop 26. This control signal is then used to cause the transducer arms 48, 48*a* to rotate from any one to any other of the twenty positions corresponding to the scanning stations of the respective tape loops.

The position control signals, for positioning the transducer units 30, 30*a*, are derived from the potentiometer 126, shown in FIGS. 8, 9 and 11, in which movable wiper 132 is coupled to the drive shaft 47 for the transducer arms 48, 48*a*. The mechanical coupling of the wiper to the drive shaft is such that the position of the movable potentiometer wiper 132 corresponds to the positioning of a transducer arm at the scanning station of one of the tape loops 26. In FIG. 11, potentiometer 126 is shown to include a circular resistor element 136 which is connected across an electrical floating voltage supply 138. Twenty uniformly spaced taps, such as tap 144, corresponding to the respective positions of the readily disposed scanning stations for the transducer units, are provided on the resistor element 136. The desired address of a scanning station is established by grounding one of these taps on the potentiometer element 136 through a switching network 137 which is controlled by a register 139 having an address signal input. Register 139, consisting of flip-flop circuits for example, is responsive to a binary digit coded input address signal for controlling the switching network to ground one of the twenty taps on the potentiometer element 136. An error signal voltage is sensed at the potentiometer wiper 132 unless the wiper is positioned at the grounded tap, and this signal can be positive or negative in potential value depending upon the position of the potentiometer wiper 132 relative to the grounded tap. The error voltage is coupled from the wiper 132 to an input of a servo amplifier 140. The output of the servo amplifier 140 is connected to the magnetic clutches 110*a* and 110*b* by respective leads 141*a* and 141*b* to automatically rotate the transducer arms 48, 48*a* from whatever position they may be in to the scanning station positions corresponding to the grounded tap on the potentiometer element 136.

A feedback signal, which is a function of the velocity of the transducer arm or the rate-of-change of the error signal voltage, is derived from the output of the potentiometer 126 by an input differentiating network including a capacitor 142. The feedback signal is added to the error signal voltage, derived directly from the potentiometer 128, to produce composite signal currents in the output leads 141*a* and 141*b* of the servo amplifier 140 for controlling the clutches 110*a*, 110*b*. The composite difference signal on output lead 141*a*, for example, would cause the clutch 110*a* to be engaged, causing clockwise rotation of shaft 47, while a signal on output lead 141*b* would cause the clutch 110*b* to be engaged and rotate the shaft 47 counterclockwise. When the transducer unit 30 approaches a position opposite the selected scanning station, the error signal voltage is reduced and the feedback or rate signal, which is a function of the velocity of the transducer arm, controls the engagement of clutches 110*a* and 110*b* to apply a torque to the arm in a direction opposite to its moving direction of rotation to minimize or eliminate overshoot of the transducer units 30, 30*a* when they arrive at positions opposite the selected scanning station.

The solenoids 86, on transducer arms 48, 48*a* described supra in connection with FIG. 6, are energized to position the transducer units radially in each of the banks of transports to cooperate with the tape loops 24 at the selected scanning stations. Thus when the transducer unit has been positioned opposite the selected scanning station, the error signal output of the potentiometer 126 returns to zero. A null detector 143 coupled to the potentiometer output responds to this zero error signal to produce an output signal which is amplified by an amplifier 144 to actuate the solenoids 86. Upon actuation of solenoids 86, the transducer units are moved radially to cooperate with the tape loop 24 at the selected scanning station. A manual switch 146 is connected in series in the solenoid energization circuit to control the radial position of the transducer units independent of the null detector 142. In this manner, the transducer units may be retracted to their normal positions independently of the positioning of the transducer arms by the positioning control system. The switch 146 has been shown as manually operated; however, it will be apparent that the switch in many instances may be controlled by a relay or gating circuit having a signal input for controlling the radial position of the transducer units.

In order to prevent undue twisting of the cable 50, shown in FIG. 1, the maximum angular travel of the transducer arms 48, 48a is controlled to be less than one revolution, as indicated in FIG. 10. The transducer units have access to tape loops on respective tape banks; however, the transducer arms 48, 48a do not move directly between the end scanning stations which correspond in position to the end-taps 147, 149 on the potentiometer element 136 (FIG. 11). A limit switch 115 (FIGS. 8 and 11) is supported on the front panel 32 within the arc to project into the path of the transducer arm 48. If, due to failure of the control system or other malfunction, the transducer arm 48 attempts to travel through the arc between the end scanning stations, the limit switch 115 will be actuated by the arm 48. The limit switch 115 is connected to switch 127 to interrupt the supply of power to the drive motor 104 and current to the brake solenoid 122, thereby, applying the brake for stopping the rotation of the transducer arms 48, 48a.

Referring now to FIGS. 12 to 15 in which the alternate preferred embodiment has been illustrated, a series of vertically positioned tape transports 200 for transporting the record medium past scanning stations 201 are shown disposed annularly about a common axis to form a cylindrical assembly configuration. A drive shaft 204 is mounted for rotation on the common axis for positioning transducer arm 205, supporting transducer units 206, 208, for cooperation with any selected pair of tape loops 212 carried by the tape transports 200. Each tape transport 200 is open at its upper end, opposite the annular path of the multi-head transducer units 206, 208, for enabling the transducer units to cooperate with the respective tape loops 212 during reading, writing or erasing information on the tapes. The transducer units 206 and 208 are mounted radially end to end on the transducer arm 205 which is secured to the drive shaft 204, as shown. The drive shaft 204 is driven by a bi-directional drive 214 including a pair of magnetic-powder counter-rotating magnetic clutches 216 which are connected to a bi-directional gear train 218 driven by a motor 220.

Figures 13, 14, 15:
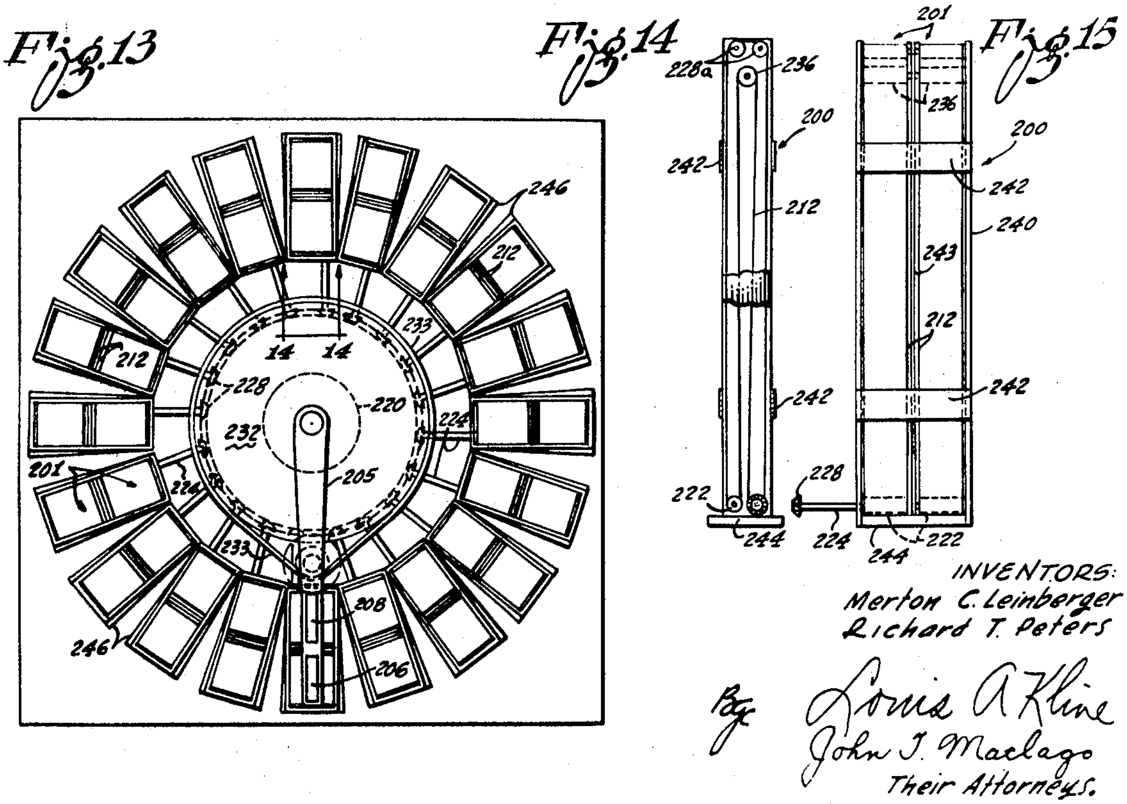
FIG. 13 is a plan view of an assembly of the alternate preferred embodiment shown in FIG. 12.
FIG. 14 is a detail view of the alternate embodiment, partly in section, of an individual tape transport with an end-plate removed.
FIG. 15 is a side view of an individual tape transport assembly of the alternate preferred embodiment.

The tape loops 212 are mounted on the tape transports 200 as shown in FIGS. 14 and 15. A pair of drive capstans 222 (FIG. 15), individual to the tape loops 212 of a tape transport, are mounted on a common capstan drive shaft 224 to be driven by a suitable motive driving source, such as a motor 226. The motor 226 is coupled to drive the capstan drive shaft 224 through a drive train including a bevel gear 228 mounted on the end of the shaft 224 and a main bevel gear 230 secured to central pulley 232. Both the main bevel gear 230 and the pulley 232 are supported for rotation on the lower end of the drive shaft 204. The pulley 232 is coupled to a pulley 234 secured on a motor drive shaft 235 by a drive belt 233. The bevel gears 228, individual to each tape transport 200, are secured on the end of the capstan drive shafts 224 to engage the bevel gear 230 when the tape transports are positioned on a base plate 237.

Each tape transport 200 includes a partial enclosure structure or magazine in which the capstans 222, idler rollers 236 and guided rollers 238 are rotatably supported in vertical side plates 240, connected by bracers 242, and a center vertical plate 243. The tape transports are mounted so as to be readily interchangeable in the data store assembly. Thus any tape transport can be easily removed and tape transports containing tapes with the needed information can be inserted to provide access to the desired information in the system. To facilitate the changing of a tape transport, a tapered bottom end-plate 244 of the magazine projects past the side plates 240 to seat under opposing retainer flanges 246 disposed on the base plate 237. The tape transports 200 are releasably secured in position in respective slots formed between opposing retainer flanges 246 by a spring-biased detent 248 for each tape transport. The detents are secured in recesses provided in the base plate 237 and project above the base plate into the respective slots. Each bottom end-plate includes a cavity for seating the respective detent element to secure the tape transport in position whereby the tape transports are properly aligned for cooperation between the tapes and the respective transducers 206, 208, and bevel gear 228 maintains engagement with the main bevel gear 230 for driving the capstans 222.

In operation, the transducer arm assembly, including the transducers 206 and 208, is driven by a motive driving source controlled by a position control system, similar to that shown in FIG. 11, whereby the transducer units can be positioned at any selected scanning station 201 to cooperate with predetermined tape loops 212 for reading, recording or erasing information on the tapes. The pairs of tape loops 212 which are mounted for rotation inside respective magazines are continuously driven by a motive driving source 226 individually coupled to drive each of the tape transports 200 by belt-driven bevel gear 230 engaging respective bevel gears 228 of the tape transports.

It will be apparent from the disclosure supra of the alternate preferred embodiments that the operation of obtaining cooperation between a transducer unit and a predetermined tape loop in a group of tape loops involves relative motion and either the transducer units or the tape loops can be moved to dispose the transducer units and the selected tape loops opposite one another for reading, recording or erasing operations. Although the alternate arrangements disclosed in detail in the specification are preferred, the invention is not intended to be limited thereto and in the light of the above teachings, various modifications and variations of the present invention are contemplated and are apparent to those skilled in the art without departing from the spirit and scope of the invention. For example, if it is desired, the transducer units can be fixed in position and the tape transports rotated to move any scanning station into position for cooperation with the face of the transducer units instead of moving the transducer units into alignment with the scanning station for reading, writing or recording on the tapes.

What is claimed is:

1. Random access data store apparatus comprising: a plurality of individual closed loop data storage tapes, each of said tapes having a recording surface for storing digital data along a plurality of data tracks; transport means for moving said tapes including a plurality of scanning stations for positioning portions of each of said tapes along a first path; and accessing means including a transducer having a plurality of recording heads in the face thereof and support means for supporting said transducer for annular movement along a second parallel path and in the direction of movement of said tapes at the respective scanning stations, and radial movement into cooperative engagement with a portion of a tape at one of said scanning stations; said support means including a drive shaft supported for axial rotation at the center of the annular path of the scanning stations, a radially projecting transducer arm supported on said drive shaft, and an elongated radially projecting member having the transducer connected to its outer end and slidably disposed for radial movement on said transducer arm; control means coupled to said accessing means for rotating said support means to position said transducer along said second parallel path at any one selected scanning station and then moving said member radially outwardly to position the transducer to cooperate with the portion of the individual tape disposed at the selected scanning station for recording and reproducing digital data along at least one of data tracks of said individual tape by respective one of the plurality of record heads positioned opposite said one data track, said support means further including a second elongated radially projecting member slidably disposed for radial movement on said transducer arm and coupled to said actuating means for simultaneous operation with said transducer support member whereby the outer end of said second member leads the transducer in radial movement; and indexing means disposed at each scanning station for cooperating with the outer end of the second member to accurately guide and position the transducer face over the portion of the individual tape disposed at the selected scanning station.

2. A random access data store comprising: a plurality of closed tape loops having a recording surface for recording information along endless data tracks; a transducer unit including a plurality of record heads cooperating with said tape loops for recording said endless data tracks and reading the data recorded on said data tracks; transducer support means for supporting said transducer unit for constrained movement along a continuous path; tape transport means including means for supporting the tape loops for movement past respective scanning stations for each tape loop, each of said scanning stations being constructed and arranged to position sequential portions of said tape loops adjacent a respective section of said path of movement of said transducer unit for cooperation with said record heads for reading and recording information along said endless data tracks; drive means for moving said transducer support means and transducer unit along said continuous path adjacent said scanning stations; control means coupled to said transducer support means for selectively positioning said transducer unit record heads opposite selected data tracks recorded on the tape loops to cooperate with the recording surface of any selected one of said tape loops to record and reproduce data along at least one data track on the respective tape loop; tape driving means drivingly coupled to said tape transport means for moving said selected tape loop continuously at a uniform recording speed prior to cooperation of said transducer unit and recording surface of the selected tape loop whereby the tape loop is moving at said uniform recording speed upon cooperation with said transducer unit in order that reading and recording always be performed at said uniform recording speed, said transducer support means including indexing means comprising an indexing rod supported for movement, and said tape transport means including support means having an indexing slot at each of said scanning stations for receiving the end of said indexing rod, said indexing means being constructed and arranged to move the indexing rod whereby said end of the indexing rod is positioned in said indexing slot at the respective scanning stations to accurately guide and position the transducer unit at any selected one of said scanning stations to cooperate with the data tracks recorded on the respective one of said tape loops for reading and recording thereon.

3. The random access data store according to claim 2 in which said transducer support means constrains the movement of the transducer unit to movement along a circular path and includes means responsive to centrifugal force exerted on the trannsducer unit during movement along said circular path for preventing radial movement of said transducer unit during rotation thereof.

References Cited

UNITED STATES PATENTS

| | | | |
|---|---|---|---|
| 2,937,239 | 5/1960 | Garber | 179—100.2 |
| 3,183,494 | 5/1965 | Welsh | 340—174.1 |
| 3,183,495 | 5/1965 | Beain | 340—174.1 |
| 3,204,228 | 8/1965 | Eckert | 340—174.1 |

TERRELL W. FEARS, Primary Examiner

U.S. Cl. X.R.

179—100.2; 346—74